US012342789B2

(12) United States Patent
Ferrara et al.

(10) Patent No.: US 12,342,789 B2
(45) Date of Patent: Jul. 1, 2025

(54) PET BOOSTER SEATS AND METHODS FOR MAKING AND USING THE SAME

(71) Applicant: PetSmart Home Office, Inc., Phoenix, AZ (US)

(72) Inventors: Casey Ferrara, Phoenix, AZ (US); Jeffrey Stocker Watson, Phoenix, AZ (US); Xue Hai Shen, Wuxi (CN)

(73) Assignee: PETSMART HOME OFFICE, INC., Phoenix, AZ (US)

( * ) Notice: Subject to any disclaimer, the term of this patent is extended or adjusted under 35 U.S.C. 154(b) by 17 days.

(21) Appl. No.: 17/884,438

(22) Filed: Aug. 9, 2022

(65) Prior Publication Data

US 2024/0049677 A1    Feb. 15, 2024

(51) Int. Cl.
*A01K 1/02* (2006.01)
(52) U.S. Cl.
CPC .................. *A01K 1/0272* (2013.01)
(58) Field of Classification Search
CPC ....... A01K 1/0272; B65D 33/02; B65D 33/24
USPC ............. 190/18, 109; 220/9.1, 9.3; 383/33
See application file for complete search history.

(56) References Cited

U.S. PATENT DOCUMENTS

| | | | |
|---|---|---|---|
| 4,943,105 A | 7/1990 | Kacar et al. | |
| 5,005,526 A * | 4/1991 | Parker | A01K 1/0272 119/751 |
| 5,479,892 A | 1/1996 | Edwards | |
| 5,671,698 A | 9/1997 | Farrugia | |
| 7,090,399 B2 * | 8/2006 | Godshaw | A45C 13/36 190/122 |
| 7,204,205 B2 | 4/2007 | O'Donnell | |
| 7,448,345 B1 | 11/2008 | O'Donnell | |
| D592,361 S | 5/2009 | Jakubowski et al. | |
| 7,886,694 B2 | 2/2011 | Jakubowski et al. | |
| 10,772,288 B1 | 9/2020 | Sandiford | |

(Continued)

FOREIGN PATENT DOCUMENTS

| | | |
|---|---|---|
| CN | 203523499 | 4/2014 |
| CN | 204070084 | 1/2015 |

(Continued)

OTHER PUBLICATIONS

Amazon.com: Outward Hound PupBoost Car Seat for Small Dogs, Adjustable Easy Attach Booster Seat, Medium, accessed on Jan. 13, 2024, product date first available Apr. 30, 2012 (Year: 2012) https://www.amazon.com/PupBoost-Adjustable-Attach-Outward-Hound/dp/B0081XIBKE/ref=sr_1_4?crid=2AJDP58HFHDPK&keywords=Outwar.*

(Continued)

*Primary Examiner* — Richard Green
*Assistant Examiner* — Katherine June Walter
(74) *Attorney, Agent, or Firm* — BRYAN CAVE LEIGHTON PAISNER LLP

(57) ABSTRACT

A pet booster seat comprising a base and an attachment member configured to detachably couple the base to a car seat of a vehicle. The base can include a shell, a liner removably coupled to the shell and configured to cover an interior of the shell, and a frame configured to maintain at least a shape of an upper portion of the base. The pet booster seat can be further configured to transition from an expanded configuration to a collapsed configuration automatically when no upward pulling force is exerted at or near the upper portion of the base. Other embodiments are disclosed.

21 Claims, 10 Drawing Sheets

(56) References Cited

U.S. PATENT DOCUMENTS

| | | | |
|---|---|---|---|
| 2001/0004882 A1* | 6/2001 | Burns | A01K 1/0254 |
| | | | 119/497 |
| 2001/0042516 A1 | 11/2001 | Best Wright | |
| 2005/0236874 A1* | 10/2005 | Godshaw | B60N 2/6009 |
| | | | 119/28.5 |
| 2005/0238261 A1* | 10/2005 | Godshaw | A45C 7/0036 |
| | | | 119/474 |
| 2005/0284415 A1 | 12/2005 | O'Donnell | |
| 2008/0011234 A1 | 1/2008 | Wilkes | |
| 2008/0156275 A1 | 7/2008 | Lam | |
| 2008/0184937 A1 | 8/2008 | Hoffman et al. | |
| 2010/0288204 A1 | 11/2010 | Costello et al. | |
| 2014/0102377 A1 | 4/2014 | Hoffman | |
| 2019/0380299 A1 | 12/2019 | Shewfelt et al. | |
| 2021/0259199 A1 | 8/2021 | Lin et al. | |
| 2021/0392848 A1 | 12/2021 | Templeton et al. | |
| 2022/0015328 A1* | 1/2022 | Ross | A01K 1/06 |
| 2022/0095582 A1* | 3/2022 | Allison | A01K 1/0272 |

FOREIGN PATENT DOCUMENTS

| | | |
|---|---|---|
| CN | 204616669 | 9/2015 |
| CN | 205455198 | 8/2016 |
| CN | 303953746 | 11/2016 |
| CN | 105309329 | 8/2017 |
| CN | 304316315 | 10/2017 |
| CN | 206841313 | 1/2018 |
| CN | 305056055 | 3/2019 |
| CN | 305083444 | 3/2019 |
| CN | 211129327 | 7/2020 |
| CN | 213246254 | 5/2021 |
| CN | 213306759 | 6/2021 |
| CN | 113229155 | 8/2021 |
| CN | 306781651 | 8/2021 |
| CN | 306859221 | 9/2021 |
| CN | 215302202 | 12/2021 |
| DE | 29615773 | 10/1996 |
| JP | 2002281854 | 10/2002 |
| JP | 2005333833 | 12/2005 |
| JP | 2015096167 | 5/2015 |
| KR | 102255649 | 5/2021 |
| KR | 102276618 | 7/2021 |
| TW | M570015 U | 11/2018 |

OTHER PUBLICATIONS

Warner, K., "Best Dog Car Seat 2022 for All Dog-Lovers: Make Yoru Dog Feel Special!" accessed at https://www.800bucklup.org/car-seat/dog/ on Feb. 24, 2022 Jan. 12, 2022.

Dog Car Booster Seat—Luxurious 2-in-1 Dog Carseat & Comfy Indoor Lounge Bed for Dogs & Cats—Easy to Install Water Resistant Pet Booster Seat for Car with Pet Seat Belt Leash (Black), accessed on Feb. 24, 2022 at https://www.pricepulse.app/dog-car-booster-seat-luxurious-2-in-1-dog-carseat_us_14864958.

Amazon.com: Kurgo Car Pet Booster Seat for Dogs or Cats, Front & Rear Dog Car Seat, Carrier Carseat for Pets, Includes Dog Seatbelt Tether, Helps With Canine Car Sickness, accessed on Feb. 24, 2022 at https://www.amazon.com/Kurgo-Rover-Booster-Tether-Black/dp/B004699SW?th=1.

* cited by examiner

1300

- 1310 providing a shell for a base
- 1320 providing a frame for the base to maintain at least a shape of an upper portion of the base
- 1330 providing a harness attachment configured to be detachably coupled to a pet harness or a pet collar
- 1340 providing a top cover configured to open or close a top opening of the base
- 1350 providing a bottom board configured to maintain a shape of a bottom of the base
- 1360 providing an attachment member configured to detachably couple the base at or near the upper portion of the base to a car seat of a vehicle
- 1370 removably inserting a cushion into a pocket of a liner
- 1380 removably coupling the liner for the base to the shell

1410 providing a pet booster seat

1420 extending an attachment member of the pet booster seat around a headrest of a car seat of the vehicle

1430 causing the attachment member to exert an upward pulling force at or near the upper portion of the base so that the pet booster seat is in a use configuration to accommodate the pet in the base

1440 placing a pet in a base of the pet booster seat, and coupling a harness attachment of the pet booster seat to a pet harness or a pet collar of the pet

1450 decoupling the harness attachment from the pet harness or the pet collar of the pet, and removing the pet from the base

1460 detaching the attachment member from the car seat

1470 causing the pet booster seat to collapse vertically and transition from a use configuration to a collapsed configuration for storage

FIG. 14

PET BOOSTER SEATS AND METHODS FOR MAKING AND USING THE SAME

TECHNICAL FIELD

This disclosure relates generally to pet products.

BACKGROUND

Many pet owners travel with their pets. When pet owners are busy driving vehicles, they want their pets to be safe and comfortable. Further, pets are preferably and, in some jurisdictions, required by law to be restrained in moving vehicles for the safety of the pets and human occupants in the vehicles. Therefore, a need exists for pet booster seats that are comfortable for the pets and can secure the pets in moving vehicles.

BRIEF DESCRIPTION OF THE DRAWINGS

To facilitate further description of the embodiments, the following drawings are provided in which:

FIG. 13 illustrates a flow chart of a method for providing a pet booster seat, according to an embodiment; and FIG. 14 illustrates a flow chart of a method for using a pet booster seat, according to an embodiment.

Figure 1:
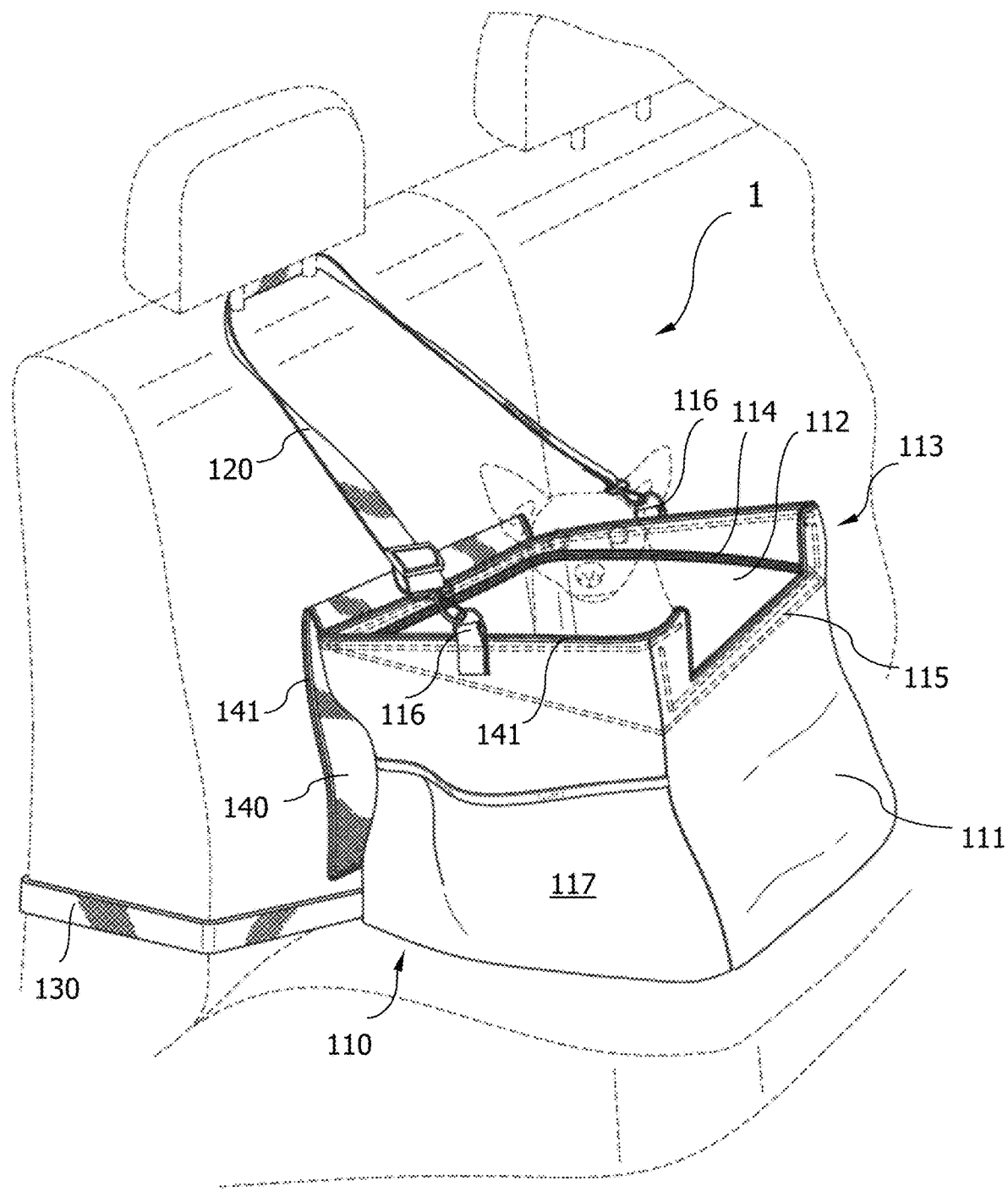
FIG. 1 illustrates a front, left side, and top perspective view of a pet booster seat in a use or expanded configuration in an exemplary environment, according to an embodiment.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real-time" encompasses operations that occur in "near" real-time or somewhat delayed from a triggering event. In a number of embodiments, "real-time" can mean real-time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, five seconds, ten seconds, thirty seconds, one minute, five minutes, ten minutes, or fifteen minutes.

DESCRIPTION OF EXAMPLES OF EMBODIMENTS

Various embodiments include a pet booster seat. The pet booster seat can include a base and an attachment member configured to detachably couple the base to a car seat of a vehicle. The base can include a shell, a liner, and a frame. The pet booster seat can be configured to transition from an expanded configuration to a collapsed configuration automatically when no upward pulling force is exerted at or near the upper portion of the base. In several embodiments, the shell and the liner can be made of similar or different flexible fabrics, and the frame can be placed at or near the upper portion of the base. Without any upward pulling force, the pet booster seat can automatically collapse vertically, due to the weight of the frame, to transition to the collapsed configuration for easy storage.

In many embodiments, the pet booster seat further can be configured to transition from the collapsed configuration to the expanded configuration when the base receives an upward pulling force, exerted through the attachment member, at or near an upper portion of the base. For example, the attachment member can be coupled to the base at or near the upper rim of the base. When the attachment member hangs on the headrest of a car seat, the upper rim of the base can be lifted and cause the base to expand vertically so that the pet booster seat can accommodate the pet in the base.

In a number of embodiments, the base of the pet booster seat can include one or more walls. In an embodiment where the base has four walls, the walls of the base can include a front wall, a rear wall, and two sidewalls. The one or more walls of the base can be of the same height or have different heights. The front wall can include a cutout in the upper edge of the front wall. The cutout can allow a pet to peek out or rest its head when lying in the base. The cutout can be of any suitable shapes and/or dimensions. In several embodiments, the base further can include one or more storage pockets coupled to an exterior surface of the shell for storing snacks, toys, bowls, etc. for the pet. The storage pockets can be located on the front wall, the left sidewall, and/or the right sidewall. The storage pockets each can be opened or closed via a fastener, such as a zipper or a hook-and-loop fastening tape, etc. In certain embodiments, the storage pockets can have bindings (e.g., polyester bindings) on the edges of the storage pockets In some embodiments, the liner of the base can be removably coupled to the shell of the base and configured to cover, at least in part, an interior of the shell. The liner can be removably coupled to the shell via any suitable fasteners, such as one or more of: zippers, hook-and-loop fasteners, magnets, and/or buttons, etc. The liner can be configured to cover the entire interior of the shell, or a part thereof (e.g., the bottom, or the lower portion of the shell, etc.). The shell can include any suitable materials, such as a flexible, durable fabric (e.g., vinyl, nylon, polyester, etc.). In a number of embodiments, the liner can include any suitable materials with various favorable features, including machine-washable, durable, comfortable, soft to touch, easy to clean, and/or water-resistant or waterproof, etc. For example, the liner can be a zip-in/zip-out fleece liner that covers substantially the entire interior or at least the lower portion of the entire interior of the shell. The liner further can include a leak-proof coating or layer (e.g., a silicone or polyurethane (PU) coating) on the exterior surface of the liner to prevent liquid pet waste from polluting the shell and/or the car seat.

In a number of embodiments, the frame can be configured to maintain a shape of an upper portion (e.g., the upper rim) of the base. The frame can be placed inside a channel formed at or near an upper portion of the shell of the base. The frame can include a bar configured to maintain a shape of a top opening of the base. For example, the bar can include a single bar member (e.g., a metal bar) bent to conform to three or four sides of the upper rim of a rectangular base, thus circumscribing at least a portion of the top opening of the base. In some embodiments, the single bar member can be bent so that the ends meet each other at a side or a corner of the upper rim of the base. In different or similar embodiments, the single bar member does not circumscribe the entire upper portion of the base, and the ends of the single bar member do not meet each other.

In some embodiments, the bar of the frame can include more than one member. For example, the bar can include a first bar member and a second bar member. In embodiments where the base includes a front wall with a cutout in the upper edge of the front wall, the first bar member can be configured to circumscribe at least a portion of the top opening of the base, and the second bar member can be configured to maintain a shape of the cutout in the upper edge of the front wall of the base. For example, the first bar member can include a first metal bar bent to conform to the entire upper rim of the base, excluding the cutout of the front wall, while the second bar member can include a second metal bar bent to form a U-shape, including a left arm, a middle portion, and a right arm. The area enclosed by the U-shape of the second bar member can include the cutout in the upper edge of the front wall. In similar or different embodiments, the channel for receiving the frame further can include one or more elements (e.g., one or more sleeves or loops) configured to keep the first and second bar members in place.

In various embodiments, the first bar member and the second bar member can be coupled together via one or more mechanical joints or not coupled together via any mechanical joints. In a number of embodiments, the first bar member can define a first plane, and the second bar member can define a second plane. When the pet booster seat is in the expanded configuration, the first plane can be substantially vertical to the second plane. When the pet booster seat is in the collapsed configuration, the first plane can be substantially parallel to the second plane.

In many embodiments, the attachment member further can include a top strap, a back strap, and/or a back loop. The top strap can be configured to extend around a headrest of the car seat. The back strap can be configured to extend around a backrest of the car seat. The back loop can be configured to allow a seatbelt of the vehicle to pass therethrough. In some embodiments, the top strap can be detachably coupled to the base. For example, the top strap can include a strap (e.g., a nylon webbing) and a trigger clip on each end of the strap. The trigger clips of the strap each can be detachably engage a corresponding D-ring located on or near the upper portion of the base. When the top strap coupled to the base hangs on the headrest, the top strap can exert an upward pulling force (as a counterforce to the gravity) on the pet booster seat at or near the upper portion of the base.

In some embodiments, the back strap can be coupled to a lower portion of the base (e.g., at or near the bottom portions of the rear wall or the sidewalls, etc.). An exemplary back strap can include two pieces of nylon webbing removably coupled together using a releasable fastener (e.g., a side release buckle, a ladder lock buckle, a hook-and-loop fastener, a snap click, etc.). Another exemplary back strap can include a strap with a releasable fastener (e.g., a male buckle, a trigger clip, etc.) on the free end of the strap, and the releasable fastener can be coupled to a corresponding component (e.g., a female buckle, a D-ring, loop, etc.) on the other side of the base. In many embodiments, the length(s) of the top strap and/or the back strap can be adjustable to secure the pet booster seat to the car seat. Further, in some embodiments, the seatbelt of the vehicle can pass through the back loop to be buckled and thus secure the pet booster seat.

In a number of embodiments, the pet booster seat further can include a cushion. The cushion can include a foam cushion pad or any suitable pad that is placed in a space between the liner and the shell. In some embodiments, the cushion can be removably received in a pocket of the liner. The pocket of the liner can be located at a bottom portion of the liner and include an opening at a bottom surface of the liner. The opening can be releasably closed by any suitable fastener, such as a zipper, a hook-and-loop fastening tape, a magnet, etc. The pocket of the liner further can include a first panel with a flap that when closed, overlaps a second panel of the pocket on the opposite side of the opening to conceal the opening.

In some embodiments, the pet booster seat further can include a harness attachment configured to be detachably coupled to a pet harness or a pet collar of the pet inside the base. The harness attachment further can be configured so that the pet can move freely in the base but cannot easily jump or fall out of the base upon impact. In many embodiments, the harness attachment can include a trigger click tether (e.g., a nylon webbing strap with a trigger clip).

In some embodiments, the pet booster seat further can include a top cover configured to open or close the top opening of the base so that the pet booster seat can be used as a carrier. The top cover can be releasably closed via one or more zippers along at least a portion of the upper portion (e.g., the upper rim) of the base. In embodiments where the front wall of the base includes a cutout in the upper edge of the front wall, the top cover further can cover the cutout. The top cover can include any suitable materials that allows airflow and does not block the pet's view when the pet is inside the base. An exemplary top cover can be a rubberized mesh with a side fixed to the upper rim of the rear wall of the base. The remaining sides of the rubberized mesh can be detachably coupled to the upper rims of the other walls of the base via one or more zippers.

In some embodiments, the pet booster seat further can include a bottom board configured to maintain a shape of a bottom of the base. The bottom board can include any suitable materials, such as plywood, Medium-Density Fiberboard (MDF), High-Density Fiberboard (HDF), etc. The bottom board can be placed between the shell and the liner. In embodiments wherein the pet booster seat includes a cushion, the bottom board can be placed below the cushion.

Various embodiments can include a method for providing a pet booster seat. The pet booster seat and its components (e.g., the base, the shell, liner, and/or frame of the base, the attachment member, etc.) each can be similar or identical to the pet booster seats and/or their corresponding components in any of the other pet booster seats described herein. The method can include providing a shell for a base for the pet booster seat. The method further can include removably coupling a liner for the base to the shell to cover an interior of the shell. The method additionally can include providing a frame for the base to maintain at least a shape of an upper portion of the base. Moreover, the method can include providing an attachment member configured to detachably couple the base at or near the upper portion of the base to a car seat of a vehicle.

In many embodiments, the pet booster seat can be configured to transition from an expanded configuration to a collapsed configuration automatically when no upward pulling force is exerted at or near the upper portion of the base. The pet booster seat further can be configured to transition from the collapsed configuration to the expanded configuration when the base receives an upward pulling force, exerted through the attachment member, at or near the upper portion of the base. In some embodiments, the upward pulling force can be exerted through the attachment member coupled to the base near a channel for receiving the frame and located at or near the upper rim of the base.

In a number of embodiments, the base further can include one or more storage pockets coupled to an exterior surface of the shell. The one or more storage pockets can be similar or identical to the storage pockets in any of the embodiments described herein. The base can include one or more walls, such as a front wall, a rear wall, and so forth. The front wall of the base can include a cutout in the upper edge of the front wall.

In some embodiments, removably coupling the liner to the shell further can include removably coupling the liner to the shell at or near the upper rim of the shell. The upper portion of the base can include the upper rim of the shell. In many embodiments, the liner can include a waterproof or water-resistant material, such as a water-resistant PU coating. In several embodiments, the liner can be removably coupled to the shell by a zipper. The liner can be unzipped and removed from the shell for washing or cleaning. The shell and the liner each can include a flexible material, e.g., fleece, nylon, etc.

In some embodiments, providing the frame for the base further can include providing a bar configured to maintain a shape of a top opening of the base. In similar or different embodiments, providing the frame for the base further can include providing: (a) a first bar member of the frame configured to circumscribe at least a portion of the top opening of the base, and (b) a second bar member of the frame configured to maintain a shape of a cutout in an upper edge of a front wall of the base. In certain embodiments, the frame of the base can include the bar which further includes the first bar member and the second bar member. In many embodiments, providing the frame further can include placing the frame inside the channel formed at or near an upper rim of the shell.

In a number of embodiments, providing the attachment member further can include providing one or more of: (a) a top strap configured to extend around a headrest of the car seat; (b) a back strap configured to extend around a backrest of the car seat; and/or (c) a back loop configured to allow a seatbelt of the vehicle to pass therethrough. The top strap can be detachably coupled to the base. The length of the top strap or the back strap can be adjustable.

In many embodiments, providing the pet booster seat further can include one or more of: (a) removably inserting a cushion into a pocket of the liner; (b) providing a harness attachment configured to be detachably coupled to a pet harness or a pet collar; (c) providing a top cover configured to open or close a top opening of the base; and/or (d) providing a bottom board configured to maintain a shape of a bottom of the base. In some embodiments, the pocket of the liner can include an opening at a bottom surface of the liner. The harness attachment can include a trigger click tether. The top cover can include a mesh material. Providing the bottom board can include placing the bottom board between the shell and the liner.

Various embodiments further can include a method for transporting a pet in a vehicle. The method can include providing a pet booster seat. The pet booster seat can be similar or identical to the pet booster seat in any of the aforementioned embodiments. The component(s) of the pet booster seat also can be similar or identical to the component(s) of any of the pet booster seat described herein. For example, the pet booster seat provided here can include a base and an attachment member. The base can include a shell, a liner removably coupled to the shell and configured to cover an interior of the shell, and a frame configured to maintain at least a shape of an upper portion of the base. The pet booster seat further can be configured to transition from an expanded configuration to a collapsed configuration automatically when no upward pulling force is exerted at or near an upper portion of the base.

In a number of embodiments, the base further can include one or more storage pockets coupled to an exterior surface of the shell. The front wall of the base can include a cutout in an upper edge of the front wall. The liner can be removably coupled to the shell at or near the upper rim of the shell, which can be part of the upper portion of the base, by any suitable fasteners (e.g., a zipper, buttons, a hook-and-loop fastening tape, etc.). The liner can include a waterproof or water-resistant material (e.g., a fabric with PU coating). Additionally, the shell and the liner each can include a flexible material.

In some embodiments, the frame of the base further can include a bar configured to maintain a shape of a top opening of the base. The bar can be bent to conform to the upper portion (e.g., the upper rim) of the base. The frame, or the bar of the frame, further can include a first bar member configured to circumscribe at least a portion of the top opening of the base and a second bar member configured to maintain a shape of the cutout in the upper edge of the front wall of the base. The frame can be placed inside a channel formed at or near an upper rim of the shell. The channel further can include one or more elements configured to hold the frame, and/or the components of the frame (e.g., the bar, the first member, and/or the second member), in place.

In a number of embodiments, the attachment member for the pet booster seat further can include one or more of: a top strap, and a back strap, and/or a back loop. In several embodiments, the top strap can be detachably coupled to the base. For example, the top strap can include an adjustable strap with one or more trigger clips coupled to one or more corresponding D-rings on the sidewall(s) of the base. The top strap can be configured to extend around a headrest of the car seat. The back strap can be configured to extend around a backrest of the car seat. The back strap can be adjustable. For example, the length of either the top strap or the back strap can be adjustable. The back loop can be configured to allow a seatbelt of the vehicle to pass therethrough and to be buckled.

In some embodiments, the pet booster seat further can include a cushion removably received in a pocket of the liner. The pocket can be coupled (e.g., sewn or glued) to the bottom portion of the liner. The pocket of the liner further can include an opening at a bottom surface of the liner. The opening can allow a user to insert the cushion into, or pull the cushion out of, the pocket. The opening further can be releasably closed by a fastener (e.g., a hook-and-loop fastening tape).

In a number embodiments, the pet booster seat further can include a harness attachment configured to be detachably coupled to a pet harness or a pet collar. The harness attachment can include a trigger click tether. The pet booster seat additionally can include a top cover (e.g., a zippered mesh cover) configured to open or close the top opening of the base, including the cutout, if any, in the upper edge of the front wall of the base. In certain embodiments, the pet booster seat further can include a bottom board (e.g., a MDF board, an acrylic board, etc.) configured to maintain a shape of a bottom of the base. The bottom board can be placed between the shell and the liner.

In many embodiments, the method for transporting the pet in the vehicle further can include extending the attachment member around a headrest of a car seat of the vehicle. The method additionally can include causing the attachment member to exert an upward pulling force at or near the upper portion of the base so that the pet booster seat is in an expanded configuration to accommodate the pet in the base. Causing the attachment member to exert the upward pulling force at or near the upper portion of the base can include adjusting the attachment member (e.g., shortening the attachment member) and/or the base (e.g., pulling a bottom portion of the base down) so that the base is expanded vertically.

In a number of embodiments, the method for transporting the pet in the vehicle further can include: (a) placing the pet in the base, and (b) coupling the harness attachment to the pet harness or the pet collar of the pet. After the pet is safely secured in the pet booster seat in the vehicle, the method further can include driving the vehicle or causing the vehicle to move to the destination. Additionally, the method can include: (a) decoupling the harness attachment from the pet harness or the pet collar of the pet, and (b) removing the pet from the base. The method also can include: (a) detaching the attachment member from the car seat, and (b) causing the pet booster seat to collapse vertically and transition from the expanded configuration to the collapsed configuration for storage. In embodiments where the pet booster seat is configured to transition from the expanded configuration to the collapsed configuration automatically when no upward pulling force is exerted at or near the upper portion of the base, causing the pet booster seat to transition from the expanded configuration to the collapsed configuration can include not exerting, or eliminating, any upward pulling forces at or near the upper portion of the base. In certain embodiments, the method further can include storing in a container the pet booster seat in the collapsed configuration.

Turning to the drawings, FIG. 1 illustrates a front, left side, and top perspective view of a pet booster seat (1) in a use or expanded configuration in a vehicle, according to an embodiment. The pet booster seat (1) includes a base (110), an attachment member (120 and/or 130) configured to detachably couple the base to a car seat of the vehicle, and a top cover (140) configured to open or close the top opening of the base (110). The base (110) includes a shell (111), a liner (112), a frame (113), a zipper (114), a channel (115), top strap attachments (116), and one or more storage pockets (117). The attachment member (120 and/or 130) includes a top strap (120) and a back strap (130). The attachment member (120 and/or 130) further can include a back loop (not shown) coupled to the rear wall of the base (110).

Here, the liner (112) is removably coupled to the shell (111) via the zipper (114). The shell (111) and the liner (112) are made of flexible fabrics (e.g., nylon, polyester, etc.). The liner (112) further can be coated with a water-resistant or waterproof layer or coating on an entire or partial surface of the liner (112) (e.g., the bottom surface facing the liner (111)). The frame (113) of the pet booster seat (1) is received in the channel (115) formed on the upper rim of the shell (111) and hidden from view. The top strap attachments (116) are located respectively on the left and right sidewalls of the base (110), at the upper portion of the base (110), at or near the upper rim of the shell (111). The top strap attachments (116) each include a D-ring configured to be detachably coupled to a trigger clip at each end of the top strap (120). The one or more storage pockets (117) are located on the left and/or right sidewalls of the base (110) and coupled to the exterior surfaces of the shell (111). The one or more storage pockets (117) can be used to store snacks, toys, or any small accessories for the pet and each can be releasably closed by a hook-and-loop fastening tape or a zipper.

As shown in FIG. 1, the top strap (120) is configured to extend around the headrest of the car seat. The top strap (120) includes a nylon webbing and a trigger clip on each end of the nylon webbing. When coupled to top strap attachments (116) of the base (110), the top strap (120) is adjustable to lift or lower the upper portion of the base (110). The back strap (130) is coupled to the bottom portion of the rear wall of the base (110). Further, the back strap (130) is configured to extend around the backrest of the car seat to secure the base (110) to the car seat. By adjusting the top strap (120) and/or back strap (130), the base (110) in the expanded configuration can be in contact with the lower seat portion of the car seat or hang above the lower seat portion.

Moreover, the top cover (140) is configured to open or close the top opening of the base (110) so that the pet booster seat (1) can double as a carrier. As shown in FIG. 1, the front wall of the base (110) includes a cutout on the upper edge of the front wall, and the top cover (140) further can cover the cutout. The top cover (140) is a rubberized mesh coupled to the upper rim of the rear wall of the base (110) and is releasably closed via one or more zippers (141) along the upper edges of the front wall and the sidewalls of the base (110), including the edges of the cutout in the upper edge of the front wall.

Still referring to FIG. 1, the pet booster seat (1) is configured to: (a) transition from the expanded configuration to a collapsed configuration automatically when no upward pulling force is exerted at or near the upper portion of the base (110), and (b) transition from the collapsed configuration to the expanded configuration when the base (110) receives an upward pulling force, exerted through the attachment member (120 and/or 130), at or near an upper portion of the base (110). For example, when the attachment member (120 and/or 130) is not hang on or coupled to anything (e.g., the headrest of a car seat) to exert an upward pulling force on the upper portion of the base (110), the weight of the frame (113) can cause the pet booster seat (1) to automatically collapse vertically and transition to the collapsed configuration. When the attachment member (120 and/or 130) hangs on the headrest of the car seat, the upper rim of the base (110) can be lifted and cause the base (110) to expand vertically and transition to the expanded configuration.

Figure 2:
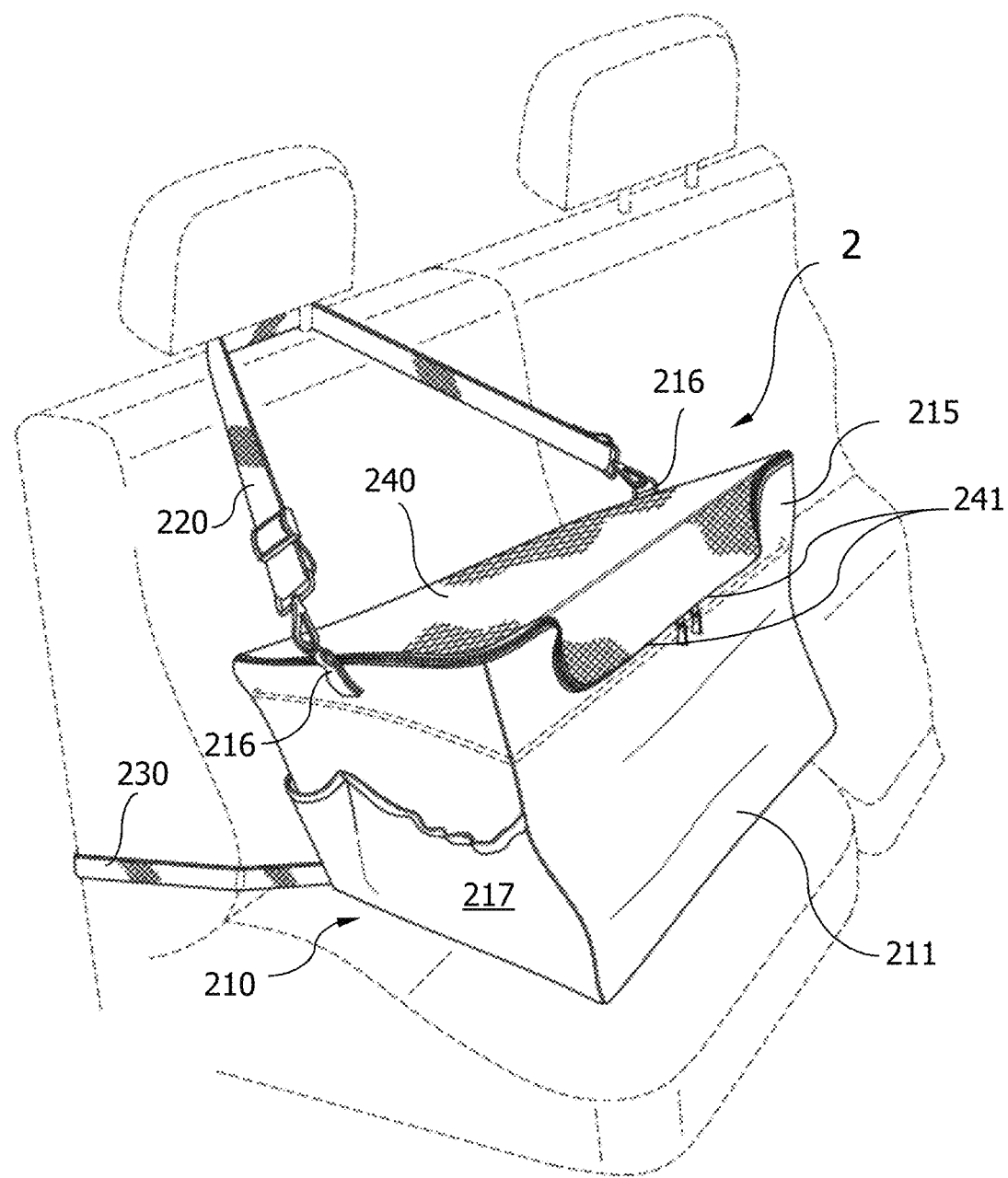
FIG. 2 illustrates a front, left side, and top perspective view of a pet booster seat in a use or expanded configuration in an exemplary environment, according to an embodiment.

Turning ahead in the drawings, FIG. 2 illustrates a front, left side, and top perspective view of a pet booster seat (2) in a use or expanded configuration in a vehicle, according to an embodiment. The pet booster seat (2) includes a base (210), a top strap (220), a back strap (230), and a top cover (240). The pet booster seat (2) and its components (e.g., the base (210), the top strap (220), etc.) can be similar or identical to the pet booster seat (1) (FIG. 1) and the components thereof, respectively. For example, the base (210) can include, among other things, a shell (211), a channel (215), two top strap attachments (216), and one or more storage pockets (217).

The pet booster seat (2) can transition between the expanded configuration and a collapsed configuration, depending on whether an upward pulling force is exerted at or near the upper portion of the base (210) (e.g., when the top strap (220) is hang on the headset to lift the upper portion of the base (210) or when a user pulls the top strap (220)). The top cover (240) can cover the entire top opening of the base (210), including the cutout in the upper edge of the front wall of the base (210). The top cover (240) in FIG. 2 closes the top opening of the base (210) by two zippers (241), the zipper sliders of which meet in the middle of the cutout. The top cover (240) is a mesh cover for airflow and allowing the pet inside the base (210) to see the environment through the top opening of the base (210) and the cutout.

Figure 3:
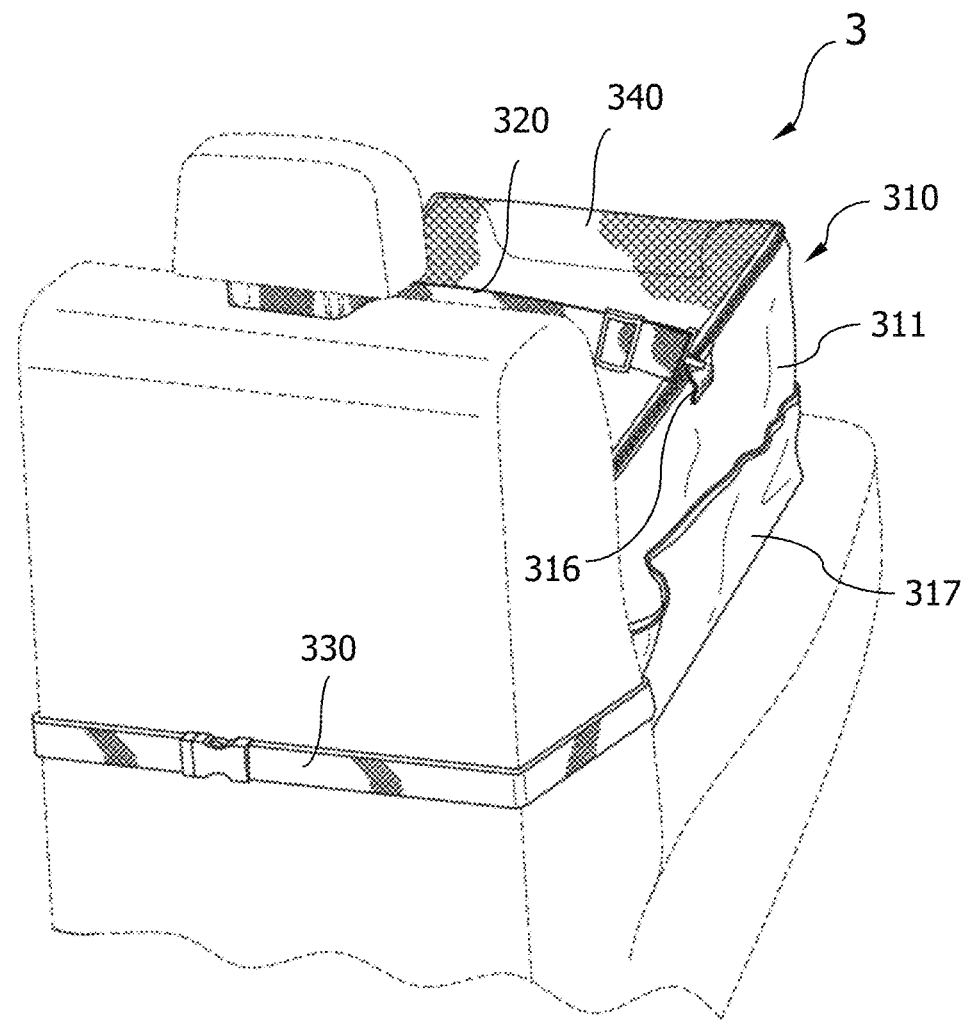
FIG. 3 illustrates a back, left side, and top perspective view of a pet booster seat in a use or expanded configuration, according to an embodiment.

Turning ahead in the drawings, FIG. 3 illustrates a back, left side, and top perspective view of a pet booster seat (3) in a use or expanded configuration in a vehicle, according to an embodiment. The pet booster seat (3) includes a base (310), a top strap (320), a back strap (330), and a top cover (340). The pet booster seat (3), and its components (e.g., the base (310), the top strap (320), etc.), each can be similar or identical to the pet booster seat (1)-(2) (FIGS. 1-2), and/or its respective components, in any of the embodiments described herein. The pet booster seat (3) can be configured to: (a) transition from the expanded configuration to a collapsed configuration automatically when the top strap (320) is detached from the car seat; and (b) transition from the collapsed configuration to the expanded configuration when the top strap (320) is hang on the headrest of the car seat. When the pet booster seat (3) is in the expanded configuration as in FIG. 3, the back strap (330) can extend around the backrest of the car seat, with 2 sub-straps of the back strap (330) (e.g., 2 pieces of nylon webbing) releasably coupled together by a fastener (e.g., a buckle, a hook-and-loop fastening tape, a snap clip, etc.). The lengths of the top strap (320) and/or the back strap (330) can be adjustable so that the pet booster seat (3) can be secured tightly to the car seat.

Figure 4:
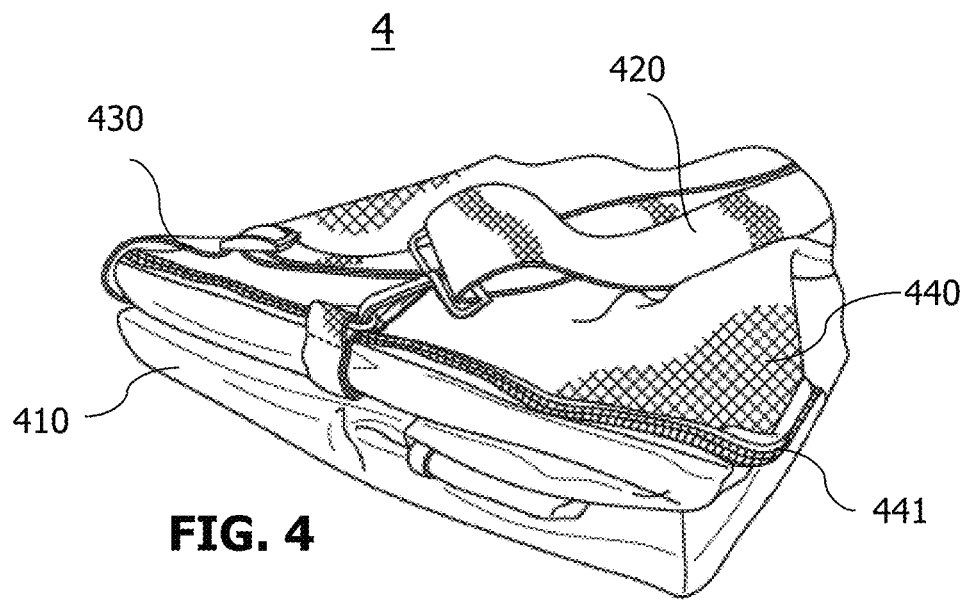
FIG. 4 illustrates a front, right side, and top perspective view of a pet booster seat in a collapsed configuration, according to an embodiment.

Turning ahead in the drawings, FIG. 4 illustrates a front, right side, and top perspective view of a portion of a pet booster seat (4) in a collapsed configuration, according to an embodiment. The pet booster seat (4) includes a base (410), a top strap (420), a back strap (430), and a top cover (440). The pet booster seat (4), and its components (e.g., the base (410), the top strap (420), etc.), each can be similar or identical to the pet booster seat (1)-(3) (FIGS. 1-3), and/or its respective components, in any of the embodiments described herein. The top cover (440) in FIG. 4 is closed via one or more zippers (441) when the pet booster seat (4), including the base (410), collapses vertically in the collapsed configuration. The pet booster seat (4) can transition from the collapsed configuration to the expanded configuration (see, e.g., FIGS. 1-3) when the top strap (420) is hang on the headrest of a car seat.

Figure 5:
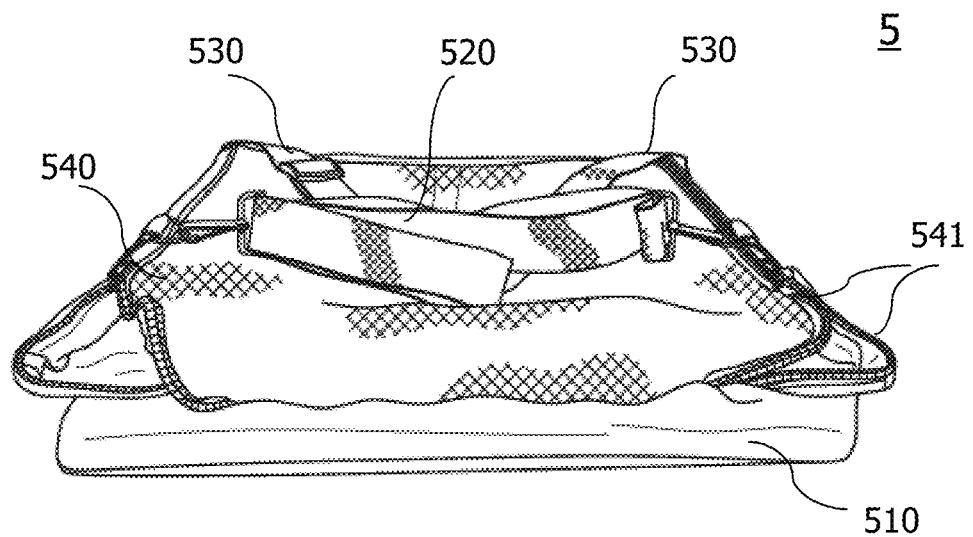
FIG. 5 illustrates a front and top perspective view of a pet booster seat in a collapsed configuration, according to an embodiment.

Turning ahead in the drawings, FIG. 5 illustrates a front and top perspective view of a pet booster seat (5) in a collapsed configuration, according to an embodiment. The pet booster seat (5) includes a base (510), a top strap (520), a back strap (530), and/or a top cover (540). The pet booster seat (5), and its components, each can be similar or identical to the pet booster seat (1)-(4) (FIGS. 1-4), and/or its respective components, in any of the embodiments described herein. Here, the top cover (540) includes one or more zippers (541) and is not entirely closed in the collapsed configuration.

Figure 6:
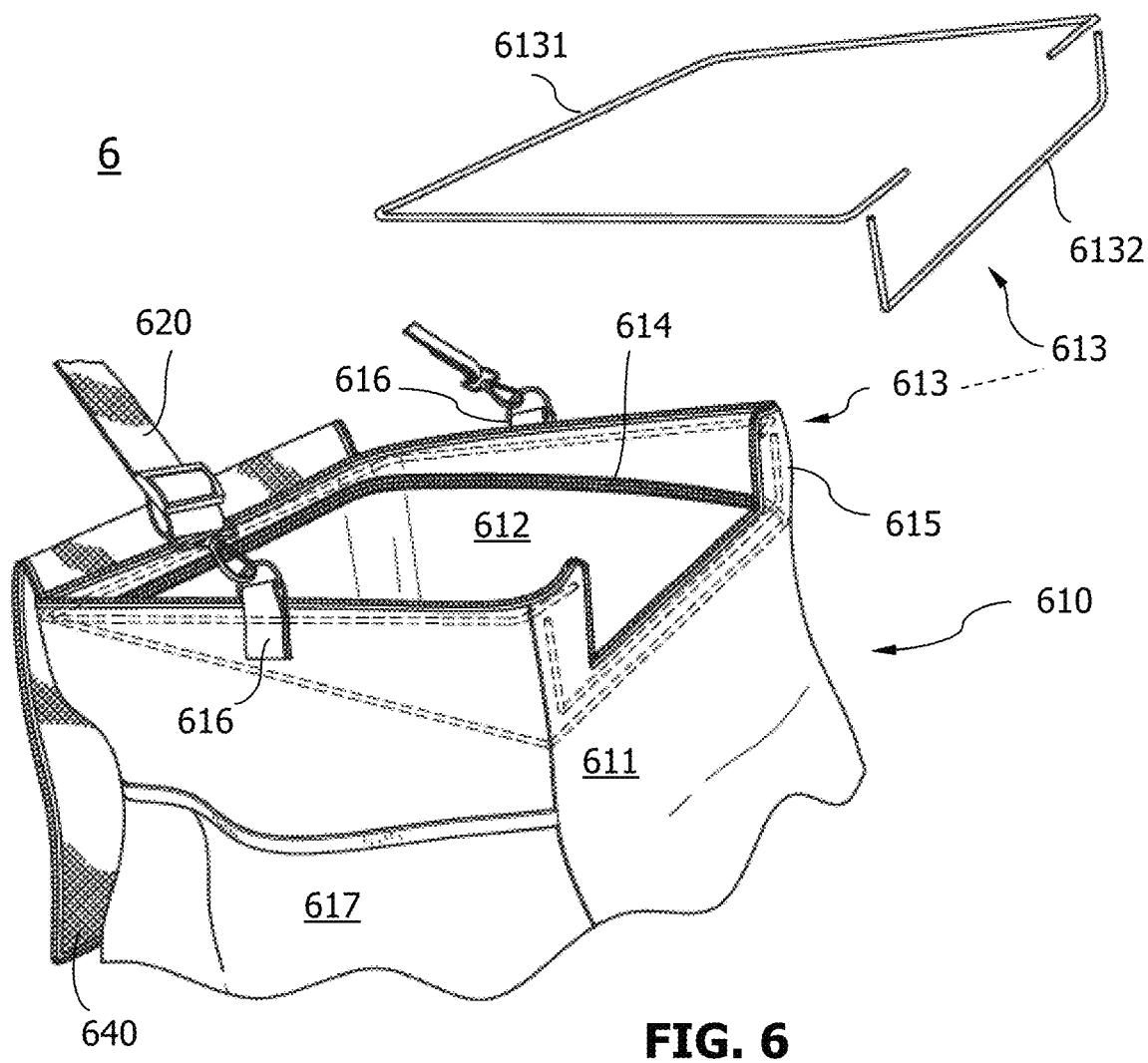
FIG. 6 illustrates a front, left side, and top perspective view of a portion of a pet booster seat, with a frame placed inside the pet booster seat displayed separately, according to an embodiment.

Turning ahead in the drawings, FIG. 6 illustrates a front, left side, and top perspective view of a portion of a pet booster seat (6) in a use or expanded configuration, according to an embodiment. FIG. 6 further illustrates a frame (613) of a base (610) of the pet booster seat (6). The pet booster seat (6) includes at least the base (610), a top strap (620), and/or a top cover (640). The pet booster seat (6), and its components, each can be similar or identical to the pet booster seat (1)-(5) (FIGS. 1-5), and/or its respective components, in any of the embodiments described herein. For example, the base (610) can include a shell (611), a liner (612), the frame (613), a zipper (614), a channel (615), top strap attachments (616), and one or more storage pockets (617). The frame (613) is configured to maintain at least a shape of an upper portion of the base (610). The frame (613) here is received in the channel (615) located at or near the upper rim of the shell (611) that is part of the upper portion of the base (610).

As shown in FIG. 6, the frame (613) includes a first frame member (6131) and a second frame member (6132). The first bar member (6131) is configured to circumscribe the top opening of the base (610). The second bar member (6132) is configured to maintain the shape of a cutout in an upper edge of a front wall of the base (610). The first bar member (6131) and the second bar member (6132) are not coupled together via any mechanical joint. Further, the first bar member (6131) defines a first plane. The second bar member (6132) defines a second plane. When the pet booster seat (6) is in the expanded configuration as in FIG. 6, the first plane is substantially vertical to the second plane. When the pet booster seat (6) is in the collapsed configuration (see, e.g., FIGS. 4-5), the front wall of the base (610) is folded inward (see, e.g., FIGS. 4-5). As such, in the process of transitioning from the expanded configuration to the collapsed configuration, the bottom portion of the second bar member (6132) is rotatably moved toward the first bar member (6131) until the first plane is substantially parallel to the second plane.

Figure 7:
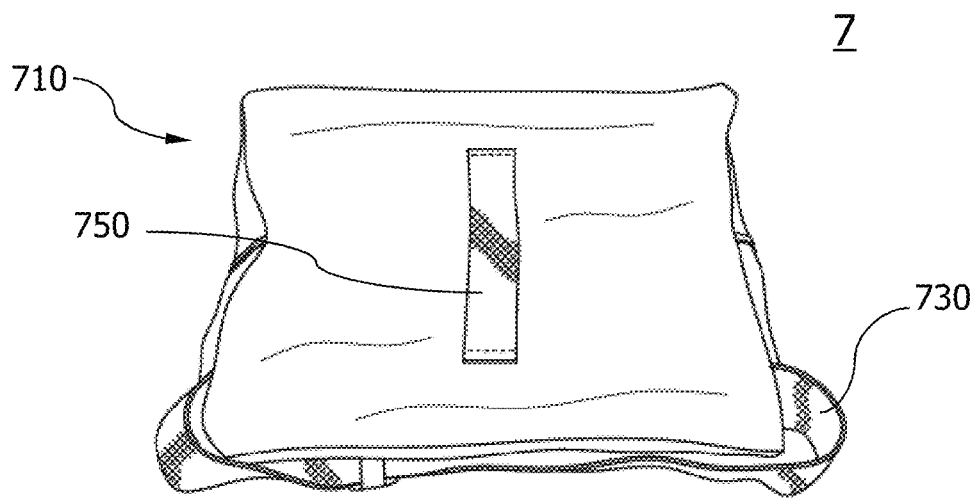
FIG. 7 illustrates a back elevation view of a pet booster seat in a use or expanded configuration, according to an embodiment.

Turning ahead in the drawings, FIG. 7 illustrates a back elevation view of a pet booster seat (7) in an expanded configuration, according to an embodiment. The pet booster seat (7) includes at least a base (710), a back strap (730), and/or a back loop (750). The pet booster seat (7), and its components, each can be similar or identical to the pet booster seat (1)-(6) (FIGS. 1-6), and/or its respective components, in any of the embodiments described herein. The back loop (750) is configured to allow a seatbelt of the vehicle to pass therethrough. The seatbelt, after passing through the back loop (750), can be fastened to the buckle socket and secure the pet booster seat (7).

Figure 8:
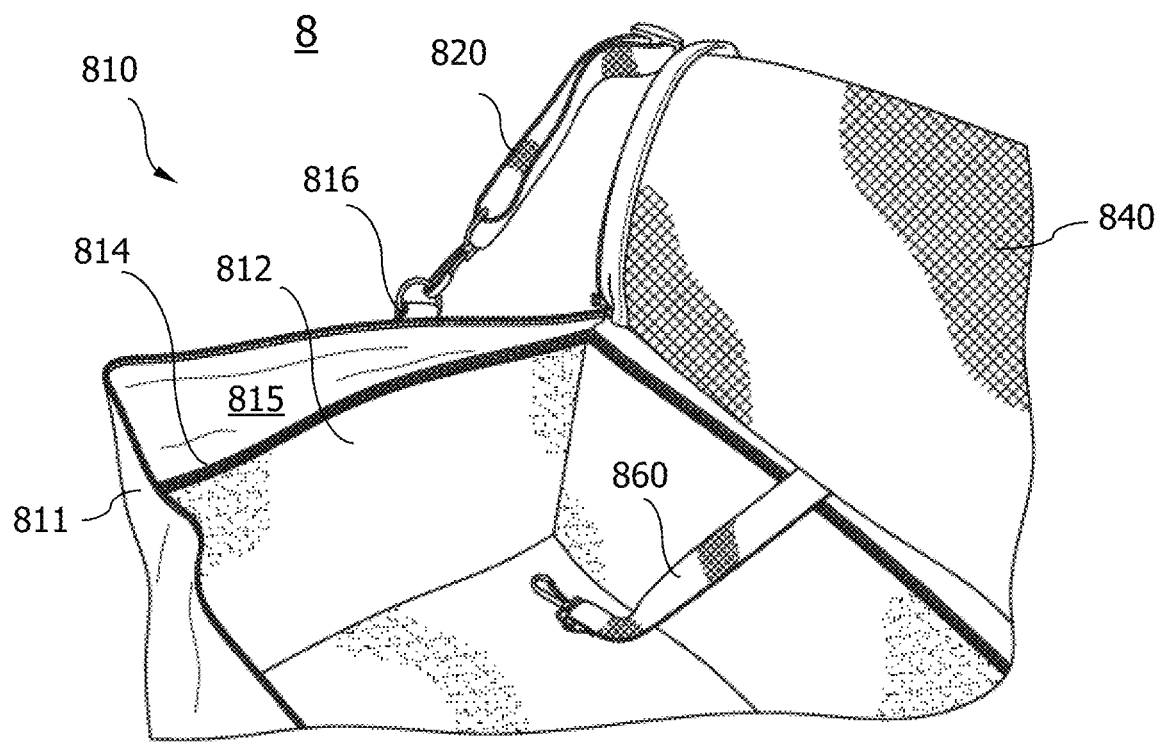
FIG. 8 illustrates a partial front and top perspective view of a portion of a pet booster seat in a use or expanded configuration, according to an embodiment.

Turning ahead in the drawings, FIG. 8 illustrates a partial front and top perspective view of a portion of a pet booster seat (8) in a use or expanded configuration, according to an embodiment. The pet booster seat (8) includes at least a base (810), a top strap (820), a top cover (840), and/or a harness attachment (860). The pet booster seat (8), and its components, each can be similar or identical to the pet booster seat (1)-(7) (FIGS. 1-7), and/or its respective components, in any of the embodiments described herein. For example, the base (810) includes at least a shell (811), a liner (812), a frame (not shown), a zipper (814), a channel (815), and/or top strap attachments (816). The liner (812) is coupled to the shell (811) via the zipper (814) to cover the lower portion of the shell (811). The channel (815) is located at or near the upper rim of the shell (811), above the zipper (814), and configured to receive the frame (not shown) (see, e.g., the frame (813) (FIG. 6)). Further, the harness attachment (860) is configured to be detachably coupled to a pet harness or a pet collar of the pet in the base (810). Here, the harness attachment (860) includes a trigger click tether that can be detachably coupled to a corresponding component (e.g., a D-ring or loop) on the pet harness or pet collar.

Figure 9:
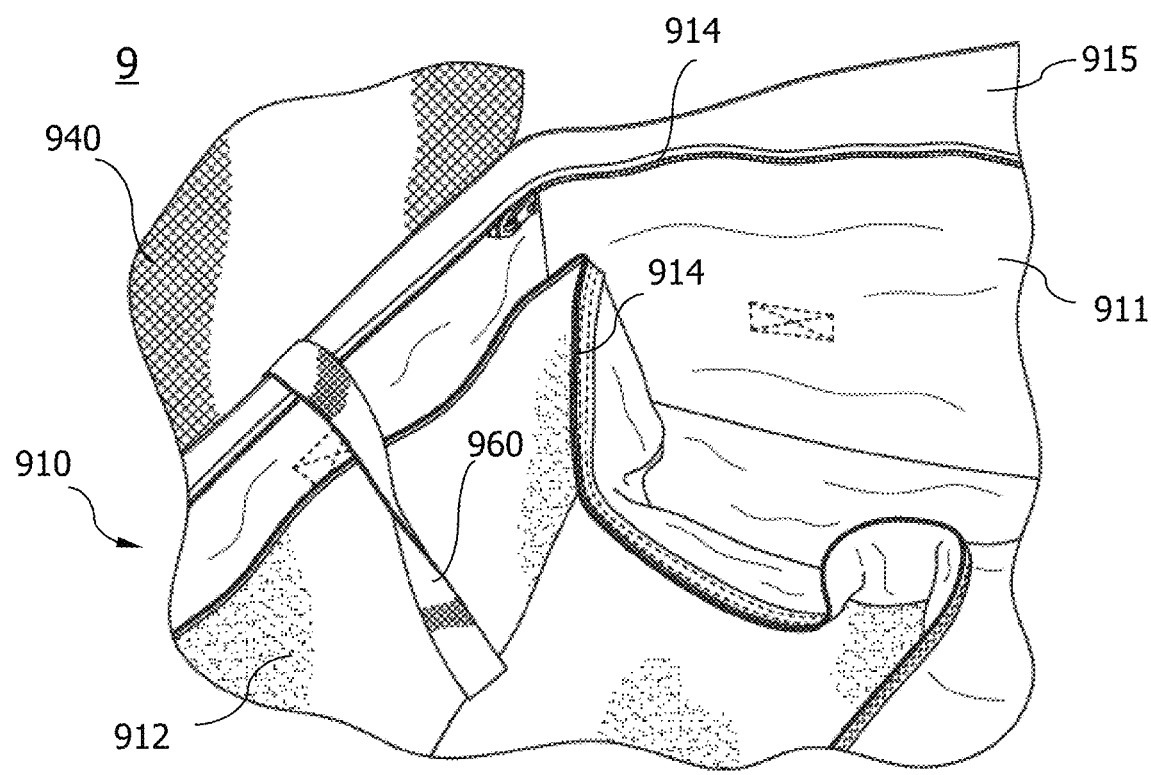
FIG. 9 illustrates a partial front and top perspective view of a portion of a pet booster seat in a use or expanded configuration, according to an embodiment.

Turning ahead in the drawings, FIG. 9 illustrates a partial front and top perspective view of a portion of a pet booster seat (9) in a use or expanded configuration, according to an embodiment. The pet booster seat (9) includes at least a base (910), a top cover (940), and/or a harness attachment (960). The pet booster seat (9), and its components, each can be similar or identical to the pet booster seat (1)-(8) (FIGS. 1-8), and/or its respective components, in any of the embodiments described herein. Here, the base (910) includes at least a shell (911), a liner (912), a zipper (914), and/or a channel (915). The liner (912) can be detachably coupled to the shell (911) by a zipper (914). The liner (912) in FIG. 9 is detached entirely from the shell (911) and can be taken out for cleaning or washing.

Figure 10:
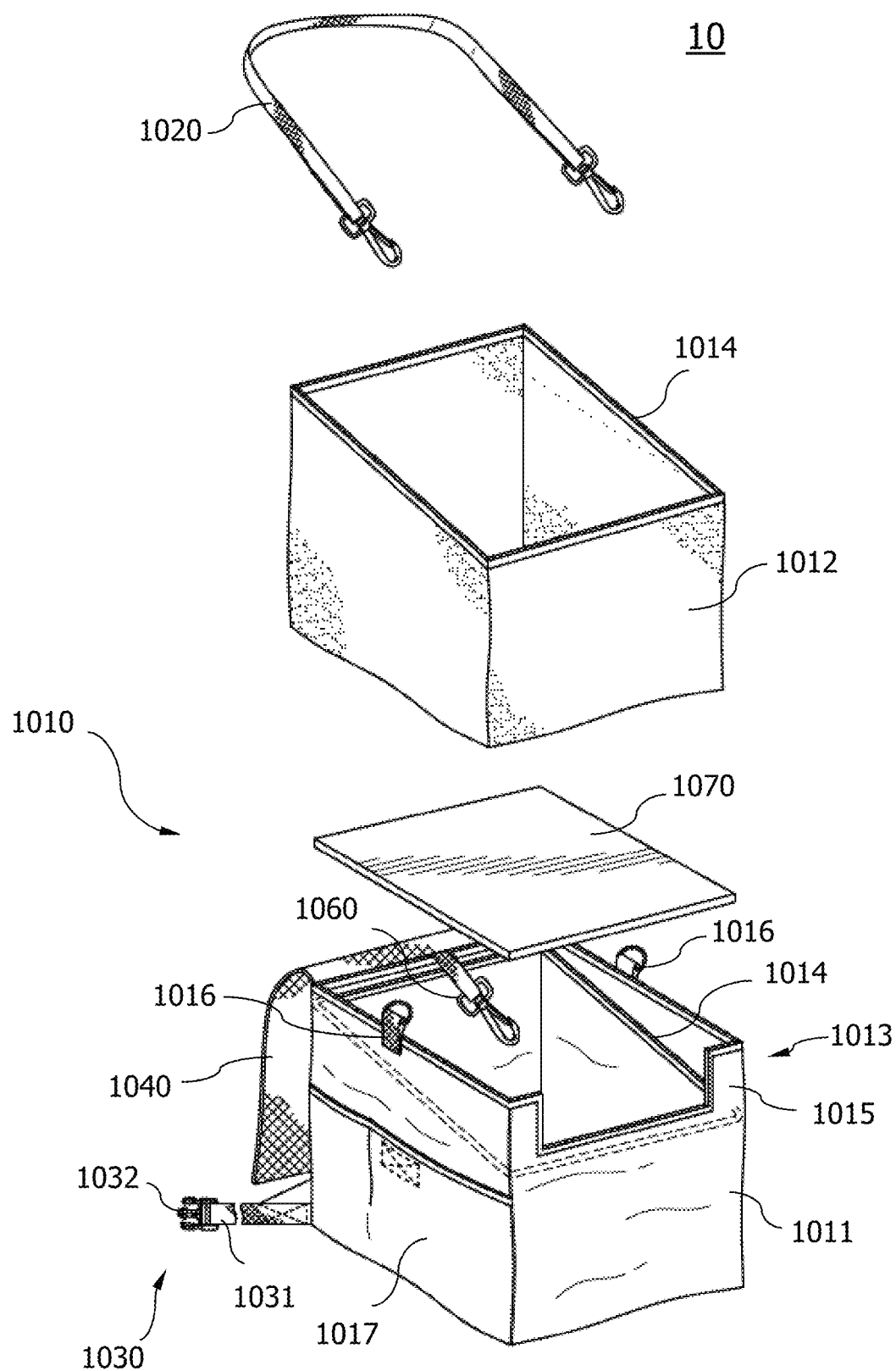
FIG. 10 illustrates an exploded view of a pet booster seat, according to an embodiment.

Turning ahead in the drawings, FIG. 10 illustrates an exploded view of a pet booster seat (10), according to an embodiment. The pet booster seat (10) includes at least a base (1010), a top strap (1020), a back strap (1030), a top cover (1040), a harness attachment (1060), and/or a bottom board (1070). The pet booster seat (10), and its components, each can be similar or identical to the pet booster seat (1)-(9) (FIGS. 1-9), and/or its respective components, in any of the embodiments described herein. The base (1010) includes: (a) a shell (1011); (b) a liner (1012) that is configured to be removably coupled to the shell (1011) by a zipper (1014) and to cover the interior of the shell (1011); (c) a frame (1013) received and hidden in a channel (1015) formed at or near an upper rim of the shell (1011); (d) top strap attachments (1016) configured to be detachably coupled to the top strap (1020); and/or (e) one or more storage pockets (1017) each coupled to an exterior surface of the shell (1011).

In some embodiments, the liner (1012) further can include a pocket (not shown) at the bottom of the liner (1012). The pocket of the liner (1012) can be configured to removably receive a cushion (not shown) and include an opening at a bottom surface of the liner (1012). The back strap (1030) shown in FIG. 10 includes a strap (1031) and a fastener (1032). The strap (1031) can be adjustable. The strap (1031) further can include one or more sub-straps. The fastener (1032) can be any suitable releasable fastener (e.g., a buckle, a snap clip, a hook-and-loop fastener, etc.). The bottom board (1070) is placed between the shell (1011) and the liner (1021) and configured to maintain a shape of a bottom of the base (1011).

Figure 11:
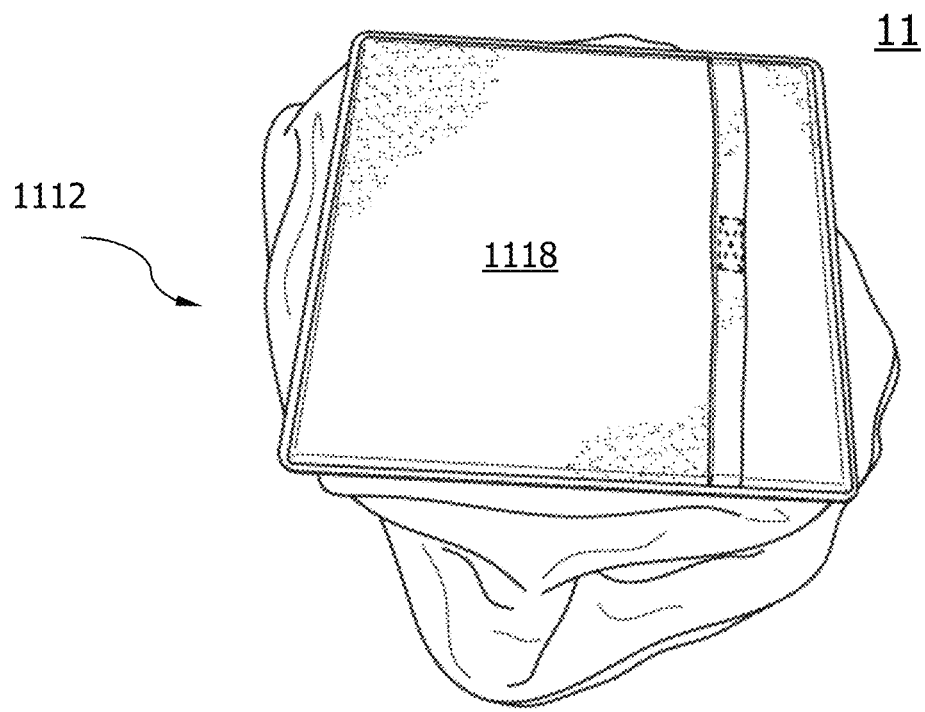
FIG. 11 illustrates a bottom view of a liner of a pet booster seat, according to an embodiment.

Turning ahead in the drawings, FIG. 11 illustrates a bottom view of a liner (1112) of a pet booster seat (11), according to an embodiment. The pet booster seat (11) includes at least a base (not shown) with the liner (1112). The pet booster seat (11), and its components (e.g., the liner (1112)), each can be similar or identical to the pet booster seat (1)-(10) (FIGS. 1-10), and/or its respective components, in any of the embodiments described herein. The liner (1112) includes a pocket (1118) configured to receive a cushion (not shown). The bottom surface of the liner (1112) includes the bottom surface of the pocket (1118). The pocket (1118) includes an opening at the bottom surface of the pocket (1118)/liner (1112). The opening of the pocket (1118) can be releasably closed by a fastener (e.g., a hook-and-loop fastener, a button, a magnet, a zipper, etc.). The opening of the pocket (1118) when closed further can be concealed by a flap.

Figure 12:
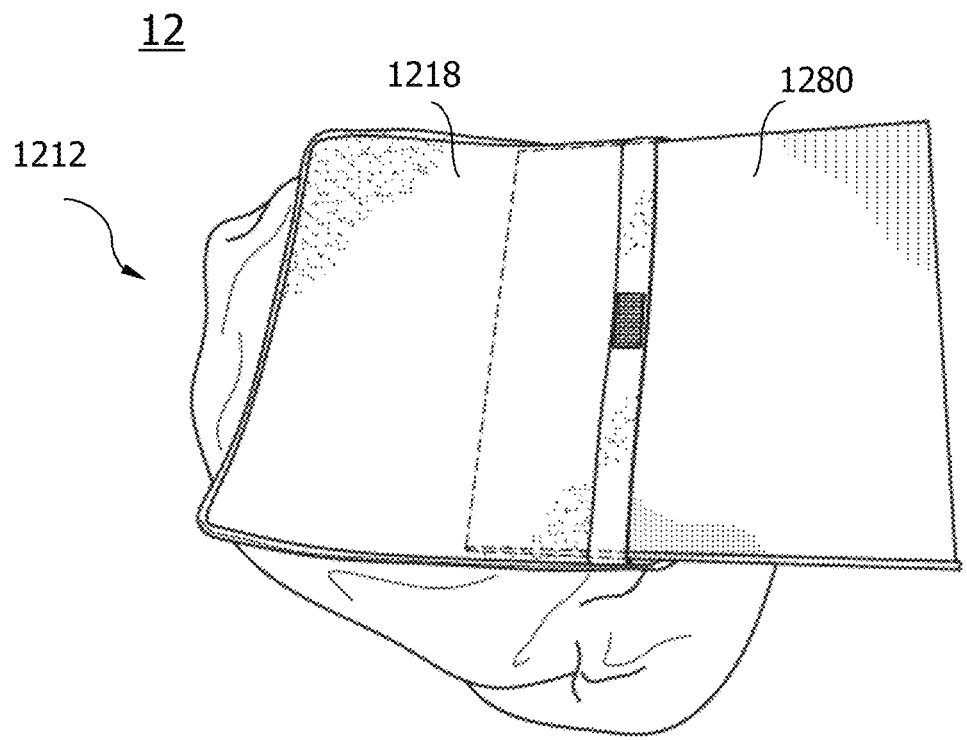
FIG. 12 illustrates a bottom view of a liner of a pet booster seat, with a cushion partially removed from a pocket of the liner, according to an embodiment.

Turning ahead in the drawings, FIG. 12 illustrates a bottom view of a liner (1212) of a pet booster seat (12), according to an embodiment. The pet booster seat (12) includes at least a base (not shown) with the liner (1212) and a cushion (1280). The pet booster seat (12), and its components (e.g., the liner (1212)), each can be similar or identical to the pet booster seat (1)-(11) (FIGS. 1-11), and/or its respective components, in any of the embodiments described herein. The liner (1212) includes a pocket (1218) configured to receive the cushion (1280). The cushion (1280) in FIG. 12 is partially removed from the pocket (1218) of the liner (1212), via an opening of the pocket (1218).

Turning ahead in the drawings, FIG. 13 illustrates a flow chart of a method (1300) for providing a pet booster seat, according to an embodiment. The method (1300) is merely exemplary and is not limited to the embodiments presented herein. The method (1300) can be employed in many different embodiments or examples not specifically depicted or described herein. In some embodiments, the procedures, the processes, and/or the activities of the method (1300) can be performed in the order presented. In other embodiments, the procedures, the processes, and/or the activities of the method (1300) can be performed in any suitable order. In still other embodiments, one or more of the procedures, the processes, and/or the activities of the method (1300) can be combined or skipped.

The pet booster seat provided by the method (1300) can be similar or identical to the pet booster seat in any of the embodiments described herein (e.g., the pet booster seat (1)-(12) (FIGS. 1-12)). In many embodiments, the pet booster seat provided in the method (1300) is configured to transition: (a) from an expanded configuration to a collapsed configuration automatically when no upward pulling force is exerted at or near the upper portion of a base for the pet booster seat; and/or (b) from the collapsed configuration to the expanded configuration when the base receives an upward pulling force exerted through an attachment member for the pet booster seat, the attachment member being coupled to the base at or near the upper portion of the base.

The method (1300) can include an activity (1310) for providing a shell for a base. The shell can be similar or identical to the shell in any of the embodiments described herein (e.g., the shell (111) (FIG. 1), (211) (FIG. 2), (311) (FIG. 3), (611) (FIG. 6), (811) (FIG. 8), (911) (FIG. 9), and/or (1011) (FIG. 10)). For example, the shell can include a flexible material. The shell further can include an upper rim, which is part of an upper portion of the base.

The base in the method (1300) can be similar or identical to the base in any of the embodiments described herein (e.g., the base (110) (FIG. 1), (210) (FIG. 2), (310) (FIG. 3), (610) (FIG. 6), (810) (FIG. 8), (910) (FIG. 9), and/or (1010) (FIG. 10)). In addition to the shell, the base can include a channel (e.g., the channel (115) (FIG. 1), (215) (FIG. 2), (615) (FIG. 6), (815) (FIG. 8), (915) (FIG. 9), and/or (1015) (FIG. 10)) formed at or near the upper rim of the shell. The base further can include one or more storage pockets (e.g., the storage pockets (117) (FIG. 1), (617) (FIG. 6), and/or (1017) (FIG. 10)) coupled to an exterior surface of the shell. Further, the base can include a front wall, a rear wall, and two sidewalls. The front wall of the base can include a cutout in the upper edge of the front wall.

The method (1300) further can include an activity (1320) for providing a frame for the base (e.g., the frame (113) (FIG. 1), (613) (FIG. 6), (813) (FIG. 8), and/or (1013) (FIG. 10)) to maintain at least a shape of an upper portion of the base. In some embodiments, providing the frame for the base in the activity (1320) further can include providing a bar configured to maintain a shape of a top opening of the base. The bar can be bent to enclose the top opening of the base. In similar or different embodiments, providing the frame for the base in the activity (1320) further can include providing: (a) a first bar member (e.g., the first bar member (6131) (FIG. 6)) of the frame configured to circumscribe at least a portion of the top opening of the base; and (b) a second bar member (e.g., the second bar member (6132) (FIG. 6)) of the frame configured to maintain a shape of a cutout in an upper edge of a front wall of the base. Further, providing the frame in the activity (1320) can include placing the frame inside the channel formed at or near the upper rim of the shell.

The method (1300) additionally can include an activity (1330) for providing a harness attachment (e.g., the harness attachment (860) (FIG. 8), (960) (FIG. 9), and/or (1060) (FIG. 10)) configured to be detachably coupled to a pet harness or a pet collar worn by a pet when the pet is inside the base. The harness attachment can include a trigger click tether or a similar component (e.g., a strap with an end coupled to the base and the other end attached to a releasable fastener).

Further, the method (1300) can include an activity (1340) for providing a top cover configured to open or close the top opening of the base. The top cover can be similar or identical to the top cover in any of the embodiments described herein (e.g., the top cover (140) (FIG. 1), (240) (FIG. 2), (340) (FIG. 3), (440) (FIG. 4), (540) (FIG. 5), (640) (FIG. 6), (840) (FIG. 8), (940) (FIG. 9), and/or (1040) (FIG. 10)). The top cover can include a mesh material. The mesh material can be strong enough to prevent the pet inside the base from breaking the top cover and escaping, while allowing airflow and not blocking view.

The method (1300) also can include an activity (1350) for providing a bottom board (e.g., the bottom board (1070) (FIG. 10)) configured to maintain a shape of a bottom of the base. The bottom board can be made of any suitable materials (e.g., plywood, an MDF board, a HDF board, an acrylic board, etc.). Providing the bottom board in the activity (1350) further can include placing the bottom board between the shell and a liner for the base. The liner can be similar or identical to the liner in any of the embodiments described herein (e.g., the liner (112) (FIG. 1), (612) (FIG. 6), (812) (FIG. 8), (912) (FIG. 9), (1012) (FIG. 10), (1112) (FIG. 11), and/or (1212) (FIG. 12)).

Further, the method (1300) can include an activity (1360) for providing an attachment member configured to detachably couple the base at or near the upper portion of the base to a car seat of a vehicle. Providing the attachment member in the activity (1360) can include providing one or more of: (a) a top strap configured to extend around a headrest of the car seat; (b) a back strap configured to extend around a backrest of the car seat; and/or (c) a back loop configured to allow a seatbelt of the vehicle to pass therethrough. The top strap can be similar or identical to the top strap in any of the embodiments described herein (e.g., the top strap (120) (FIG. 1), (220) (FIG. 2), (320) (FIG. 3), (420) (FIG. 4), (520) (FIG. 5), (620) (FIG. 6), (820) (FIG. 8), and/or (1020) (FIG. 10)). The top strap can be detachably coupled to the base. The back strap can be similar or identical to the back strap in any of the embodiments described herein (e.g., the back strap (130) (FIG. 1), (230) (FIG. 2), (330) (FIG. 3), (430) (FIG. 4), (530) (FIG. 5), (730) (FIG. 7), and/or (1030) (FIG. 10)). The length of the top strap or the back strap can be adjustable. Further, the back loop can be similar or identical to the back loop in any of the embodiments described herein (e.g., the back loop (750) (FIG. 7)).

In addition, the method (1300) can include an activity (1370) for removably inserting a cushion (e.g., the cushion (1280) (FIG. 12)) into a pocket of the liner. The method (1300) further can include an activity (1380) for removably coupling the liner for the base to the shell to cover an interior of the shell. The liner can include a material that is flexible and/or water-resistant or waterproof. The material of the liner further can be machine washable and easy to clean. Removably coupling the liner to the shell in the activity (1380) further can include removably coupling the liner to the shell at or near the upper rim of the shell. The liner can be removably coupled to the shell by any suitable fastener (e.g., a zipper).

Turning ahead in the drawings, FIG. 14 illustrates a flow chart of a method (1400) for using a pet booster seat to transport a pet in a vehicle, according to an embodiment. The method (1400) is merely exemplary and is not limited to the embodiments presented herein. The method (1400) can be employed in many different embodiments or examples not specifically depicted or described herein. In some embodiments, the procedures, the processes, and/or the activities of the method (1400) can be performed in the order presented. In other embodiments, the procedures, the processes, and/or the activities of the method (1400) can be performed in any suitable order. In still other embodiments, one or more of the procedures, the processes, and/or the activities of the method (1400) can be combined or skipped.

The method (1400) can include an activity (1410) for providing the pet booster seat. The pet booster seat used in the method (1400) can be similar or identical to the pet booster seat in any of the embodiments described herein (e.g., the pet booster seat (1)-(12) (FIGS. 1-12)). In many embodiments, the pet booster seat used in the method (1400) is configured to transition: (a) from an expanded configuration to a collapsed configuration automatically when no upward pulling force is exerted at or near the upper portion of a base for the pet booster seat; and/or (b) from the collapsed configuration to the expanded configuration when the base receives an upward pulling force exerted through an attachment member for the pet booster seat, the attachment member being coupled to the base at or near the upper portion of the base.

The method (1400) further can include an activity (1420) for extending an attachment member of the pet booster seat around a headrest of a car seat of the vehicle. The attachment member can be similar or identical to the attachment member in any of the embodiments described herein. The attachment member can include one or more: (a) a top strap configured to extend around a headrest of the car seat; (b) a back strap configured to extend around a backrest of the car seat; and/or (c) a back loop configured to allow a seatbelt of the vehicle to pass therethrough. The top strap can be similar or identical to the top strap in any of the embodiments described herein (e.g., the top strap (120) (FIG. 1), (220) (FIG. 2), (320) (FIG. 3), (420) (FIG. 4), (520) (FIG. 5), (620) (FIG. 6), (820) (FIG. 8), and/or (1020) (FIG. 10)). The top strap can be detachably coupled to the base. Extending the attachment member of the pet booster seat around the headrest in the activity (1420) can include extending the top strap around the headrest. In addition, the back strap can be similar or identical to the back strap in any of the embodiments described herein (e.g., the back strap (130) (FIG. 1), (230) (FIG. 2), (330) (FIG. 3), (430) (FIG. 4), (530) (FIG. 5), (730) (FIG. 7), and/or (1030) (FIG. 10)). The length of the top strap or the back strap can be adjustable. Further, the back loop can be similar or identical to the back loop in any of the embodiments described herein (e.g., the back loop (750) (FIG. 7)).

The method (1400) also can include an activity (1430) for causing the attachment member to exert an upward pulling force at or near the upper portion of the base so that the pet booster seat is in the expanded configuration to accommodate the pet in the base. Causing the attachment member to exert the upward pulling force in the activity (1430) can include adjusting the length of the top strap so that the upper portion of the base is elevated, and the base is thus expanded. Causing the attachment member to exert the upward pulling force in the activity (1430) further can include extending the back strap around a backrest of the car seat and/or adjusting the back strap so that the lower portion of the base does not move upward when the upward pulling force is applied to the upper portion of the base.

Additionally, the method (1400) can include an activity (1440) for placing a pet in the base of the pet booster seat, and coupling a harness attachment of the pet booster seat to a pet harness or a pet collar of the pet. The base can be similar or identical to the base in any of the embodiments described herein (e.g., the base (110) (FIG. 1), (210) (FIG. 2), (310) (FIG. 3), (610) (FIG. 6), (810) (FIG. 8), (910) (FIG. 9), and/or (1010) (FIG. 10)). The harness attachment can be similar or identical to the harness attachment in any of the embodiments described herein (e.g., the harness attachment (860) (FIG. 8), (960) (FIG. 9), and/or (1060) (FIG. 10)). For example, the harness attachment can include a trigger click tether.

The method (1400) additionally can include an activity (1450) for decoupling the harness attachment from the pet harness or the pet collar of the pet, and removing the pet from the base. Before or after the activity (1450), the method (1400) further can include an activity (1460) for detaching the attachment member from the car seat. In some embodiments, detaching the attachment member from the car seat further can include one or more of: (a) adjusting the top strap of the base; (b) removing the top strap from the headrest of the car seat; (c) unfastening/unbuckling and removing the back strap from the backrest of the car sea; and/or (d) disengaging the seatbelt from the back loop of the base.

The method (1400) also can include an activity (1470) for causing the pet booster seat to collapse vertically and transition from the expanded configuration to the collapsed configuration for storage. Causing the pet booster seat to collapse vertically can include adjusting the attachment member (e.g., lengthening the top strap of the attachment member) so that no upward pulling force is applied to the upper portion of the base, and the pet booster seat thus automatically collapses vertically and transitions to the collapsed configuration.

In many embodiments, the method (1400) further can include one or more additional or alternate activities. For example, between the activity (1440) and the activity (1450), the method (1400) further can include transporting the pet in the base of the pet booster seat via the vehicle until the vehicle arrives at the destination. In similar or different embodiments, the method (1400) also can include closing a top cover for the pet booster seat, after the activities (1430) and/or (1440), and/or opening the top cover, if closed, before the activity (1450). The method further can include carrying, via the attachment member, the pet booster seat, with the pet inside, into or out of the vehicle. Carrying the pet booster seat into the vehicle can be performed after the activities (1430) and/or (1440) and/or closing the top cover and before the activity (1420). Carrying the pet booster seat out of the vehicle can be performed after the activity (1460) and before the activities (1450) and/or (1470) and/or opening the top cover.

Although the pet booster seat and the methods for providing or using the pet booster seat have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any components of the pet booster seat disclosed herein, as well as the activities for providing or using the pet booster seat, may be modified, and that the foregoing discussion of certain of these embodiments does not necessarily represent a complete description of all possible embodiments.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A pet booster seat comprising:
   a base comprising:
      a shell comprising a first portion of a fastener;
      a liner comprising a second portion of the fastener and removably coupled to the shell by the fastener when the first and second portions of the fastener are removably coupled together, wherein the liner is configured to cover an interior of the shell and wherein the fastener is located in the interior of the shell;
      a top cover configured such that, when at least a portion of the top cover is removably secured to an upper portion of the base, the liner and the fastener are not accessible from an exterior of the shell; and
      a frame configured to maintain at least a shape of the upper portion of the base, wherein the frame comprises:
         a first bar member; and
         a second bar member configured to maintain a shape of a cutout in an upper edge of a front wall of the base; and
   an attachment member configured to detachably couple the base to a car seat of a vehicle,
   wherein:
      the pet booster seat is further configured to transition from a use configuration to a collapsed configuration automatically when no upward pulling force is exerted at or near the upper portion of the base;
      when the pet booster seat is in the use configuration, a first plane defined by the first bar member is substantially vertical to a second plane defined by the second bar member; and
      when the pet booster seat is in the collapsed configuration, the first plane is substantially parallel to the second plane.

2. The pet booster seat of claim 1, wherein:
   the first bar member and the second bar member are configured to maintain a shape of a top opening of the base.

3. The pet booster seat of claim 2, wherein the first bar member is configured to circumscribe at least a portion of the top opening of the base.

4. The pet booster seat of claim 1, wherein
   the first bar member and the second bar member are not coupled together via a mechanical joint.

5. The pet booster seat of claim 1, wherein one or more of:
   a. the pet booster seat is further configured to transition from the collapsed configuration to the use configuration when the base receives an upward pulling force exerted through the attachment member located at or near the upper portion of the base;
   b. the base further comprises one or more storage pockets coupled to an exterior surface of the shell;
   c. the frame is located inside a channel formed at or near an upper rim of the shell, and the upper portion of the base comprises the upper rim of the shell;
   d. the attachment member further comprises one or more of:
      a top strap configured to extend around a headrest of the car seat;
      a back strap configured to extend around a backrest of the car seat; or
      a back loop configured to allow a seatbelt of the vehicle to pass therethrough;
   e. the liner is removably coupled to the shell at or near the upper rim of the shell, and the upper portion of the base comprises the upper rim of the shell;
   f. the liner comprises a waterproof material;
   g. the fastener comprises a zipper; or
   h. the shell and the liner each comprise a flexible material.

6. The pet booster seat of claim 1, wherein the attachment member further comprises one or more of:
   a top strap configured to extend around a headrest of the car seat, wherein at least one of:
      the top strap is detachably coupled to the base; or
      a length of the top strap is adjustable;
   a back strap configured to extend around a backrest of the car seat, wherein a length of the back strap is adjustable; or
   a back loop configured to allow a seatbelt of the vehicle to pass therethrough.

7. The pet booster seat of claim 1, wherein:
   the pet booster seat further comprises one or more of:
      (a) a cushion removably received in a pocket of the liner;
      (b) a harness attachment configured to be detachably coupled to a pet harness or a pet collar;
      (c) a bottom board configured to maintain a shape of a bottom of the base; or
      (d) the top cover is configured to open or close a top opening of the base.

8. The pet booster seat of claim 1, further comprising one or more of:
(a) a cushion removably received in a pocket of the liner, wherein the pocket of the liner comprises an opening at a bottom surface of the liner;
(b) a harness attachment configured to be detachably coupled to a pet harness or a pet collar, wherein the harness attachment comprises a trigger click tether;
(c) the top cover comprises a mesh material; or
(d) a bottom board configured to maintain a shape of a bottom of the base, wherein the bottom board is located between the shell and the liner.

9. A method for providing a pet booster seat, the method comprising:
providing a shell for a base, wherein the shell comprises a first portion of a fastener;
removably coupling a liner for the base to the shell by the fastener, wherein the liner comprises a second portion of the fastener, wherein the liner is removably coupled to the shell when the first and second portions of the fastener are removably coupled together, wherein the liner is configured to cover an interior of the shell and wherein the fastener is located in the interior of the shell;
providing for a top cover configured such that, when at least a portion of the top cover is removably secured to an upper portion of the base, the liner and the fastener are not accessible from an exterior of the shell;
providing a frame for the base to maintain at least a shape of the upper portion of the base, wherein the frame comprises:
a first bar member; and
a second bar member configured to maintain a shape of a cutout in an upper edge of a front wall of the base; and
providing an attachment member configured to detachably couple the base at or near the upper portion of the base to a car seat of a vehicle,
wherein:
the pet booster seat is configured to transition from a use configuration to a collapsed configuration automatically when no upward pulling force is exerted at or near the upper portion of the base;
when the pet booster seat is in the use configuration, a first plane defined by the first bar member is substantially vertical to a second plane defined by the second bar member; and
when the pet booster seat is in the collapsed configuration, the first plane is substantially parallel to the second plane.

10. The method of claim 9, wherein one or more of:
(a) providing the frame for the base further comprises configuring the first bar member and the second bar member to maintain a shape of a top opening of the base;
(b) providing the frame for the base further comprises providing:
the first bar member of the frame is configured to circumscribe at least a portion of the top opening of the base;
(c) the pet booster seat is further configured to transition from the collapsed configuration to the use configuration when the base receives an upward pulling force exerted through the attachment member located at or near the upper portion of the base;
(d) the base further comprises one or more storage pockets coupled to an exterior surface of the shell;
(e) the front wall of the base comprises the cutout in the upper edge of the front wall;
(f) providing the frame further comprises placing the frame inside a channel formed at or near an upper rim of the shell, wherein the upper portion of the base comprises the upper rim of the shell;
(g) providing the attachment member further comprises providing one or more of:
a top strap configured to extend around a headrest of the car seat;
a back strap configured to extend around a backrest of the car seat; or
a back loop configured to allow a seatbelt of the vehicle to pass therethrough;
(h) removably coupling the liner to the shell further comprises removably coupling the liner to the shell at or near the upper rim of the shell, and the upper portion of the base comprises the upper rim of the shell;
(i) the liner comprises a water-resistant or waterproof material;
(j) the fastener comprises a zipper; or
(k) the shell and the liner each comprise a flexible material.

11. The method of claim 9, wherein the attachment member further comprises one or more of:
a top strap configured to extend around a headrest of the car seat, wherein at least one of:
the top strap is detachably coupled to the base; or
a length of the top strap is adjustable;
a back strap configured to extend around a backrest of the car seat, wherein a length of the back strap is adjustable; or
a back loop configured to allow a seatbelt of the vehicle to pass therethrough.

12. The method of claim 9, further comprising one or more of:
(a) removably inserting a cushion into a pocket of the liner;
(b) providing a harness attachment configured to be detachably coupled to a pet harness or a pet collar;
(c) configuring the top cover to open or close a top opening of the base; or
(d) providing a bottom board configured to maintain a shape of a bottom of the base.

13. The method of claim 9, further comprising one or more of:
(a) removably inserting a cushion into a pocket of the liner, wherein the pocket of the liner comprises an opening at a bottom surface of the liner;
(b) providing a harness attachment configured to be detachably coupled to a pet harness or a pet collar, wherein the harness attachment comprises a trigger click tether;
(c) configuring the top cover to open or close a top opening of the base, wherein the top cover comprises a mesh material; or
(d) providing a bottom board configured to maintain a shape of a bottom of the base, wherein providing the bottom board comprises placing the bottom board between the shell and the liner.

14. A method for transporting a pet in a vehicle, the method comprising:
providing a pet booster seat, the pet booster seat comprising:
a base comprising:
a shell comprising a first portion of a fastener;

a liner comprising a second portion of the fastener and removably coupled to the shell by the fastener when the first and second portions of the fastener are removably coupled together, wherein the liner is configured to cover an interior of the shell and wherein the fastener is located in the interior of the shell;

a top cover configured such that, when at least a portion of the top cover is removably secured to an upper portion of the base, the liner and the fastener are not accessible from an exterior of the shell; and a frame configured to maintain at least a shape of the upper portion of the base, wherein the frame comprises:
  a first bar member; and
  a second bar member configured to maintain a shape of a cutout in an upper edge of a front wall of the base; and an attachment member;

extending the attachment member around a headrest of a car seat of the vehicle; and causing the attachment member to exert an upward pulling force at or near the upper portion of the base so that the pet booster seat is in a use configuration to accommodate the pet in the base, wherein:
  the pet booster seat is further configured to transition from the use configuration to a collapsed configuration automatically when no upward pulling force is exerted at or near the upper portion of the base;
  when the pet booster seat is in the use configuration, a first plane defined by the first bar member is substantially vertical to a second plane defined by the second bar member; and
  when the pet booster seat is in the collapsed configuration, the first plane is substantially parallel to the second plane.

15. The method of claim 14, wherein one or more of:
(a) the first bar member and the second bar member are configured to maintain a shape of a top opening of the base;
(b) the first bar member is configured to circumscribe at least a portion of the top opening of the base;
(c) the base further comprises one or more storage pockets coupled to an exterior surface of the shell;
(d) the frame is placed inside a channel formed at or near an upper rim of the shell, and the upper portion of the base comprises the upper rim of the shell;
(e) the attachment member further comprises one or more of:
  a top strap configured to extend around the headrest of the car seat;
  a back strap configured to extend around a backrest of the car seat; or
  a back loop configured to allow a seatbelt of the vehicle to pass therethrough;
(f) the liner is removably coupled to the shell at or near the upper rim of the shell, and the upper portion of the base comprises the upper rim of the shell;
(g) the liner comprises a waterproof material;
(h) the fastener comprises a zipper; or
(i) the shell and the liner each comprise a flexible material.

16. The method of claim 14, wherein the attachment member further comprises one or more of:
  a top strap configured to extend around the headrest of the car seat, wherein at least one of:
    the top strap is detachably coupled to the base; or
    a length of the top strap is adjustable;
  a back strap configured to extend around a backrest of the car seat, wherein a length of the back strap is adjustable; or
  a back loop configured to allow a seatbelt of the vehicle to pass therethrough.

17. The method of claim 14, wherein the pet booster seat further comprises one or more of:
(a) a cushion removably received in a pocket of the liner;
(b) a harness attachment configured to be detachably coupled to a pet harness or a pet collar;
(c) wherein the top cover is configured to open or close a top opening of the base; or
(d) a bottom board configured to maintain a shape of a bottom of the base.

18. The method of claim 14, wherein:
the pet booster seat further comprises one or more of:
(a) a cushion removably received in a pocket of the liner, wherein the pocket of the liner comprises an opening at a bottom surface of the liner;
(b) a harness attachment configured to be detachably coupled to a pet harness or a pet collar, wherein the harness attachment comprises a trigger click tether;
(c) wherein the top cover is configured to open or close a top opening of the base, wherein the top cover comprises a mesh material; or
(d) a bottom board configured to maintain a shape of a bottom of the base, wherein the bottom board is placed between the shell and the liner.

19. The method of claim 14, wherein:
the pet booster seat further comprises one or more of:
(a) a cushion removably received in a pocket of the liner;
(b) a harness attachment configured to be detachably coupled to a pet harness or a pet collar;
(c) wherein the top cover is configured to open or close a top opening of the base; or
(d) a bottom board configured to maintain a shape of a bottom of the base; and
the method further comprises one or more of:
  a. placing the pet in the base; and
    coupling the harness attachment to the pet harness or the pet collar of the pet; or
  b. decoupling the harness attachment from the pet harness or the pet collar of the pet; and
    removing the pet from the base.

20. The method of claim 14, further comprising:
detaching the attachment member from the car seat; and
causing the pet booster seat to collapse vertically and transition from the use configuration to the collapsed configuration for storage.

21. The pet booster seat of claim 1, wherein:
the frame is located inside a channel at or near an upper rim of the shell;
the upper portion of the base comprises the upper rim of the shell;
  the first bar member is configured to (a) circumscribe at least a portion of a top opening of the base and (b) maintain at least a portion of the shape of the upper portion of the base; and
the attachment member comprises a loop configured to allow a seatbelt of a of the vehicle to pass therethrough.

* * * * *